Jan. 21, 1941. B. DICK 2,229,056
PARKING BRAKE AND ACCELERATOR INTERLOCK
Filed Aug. 25, 1939 2 Sheets-Sheet 1
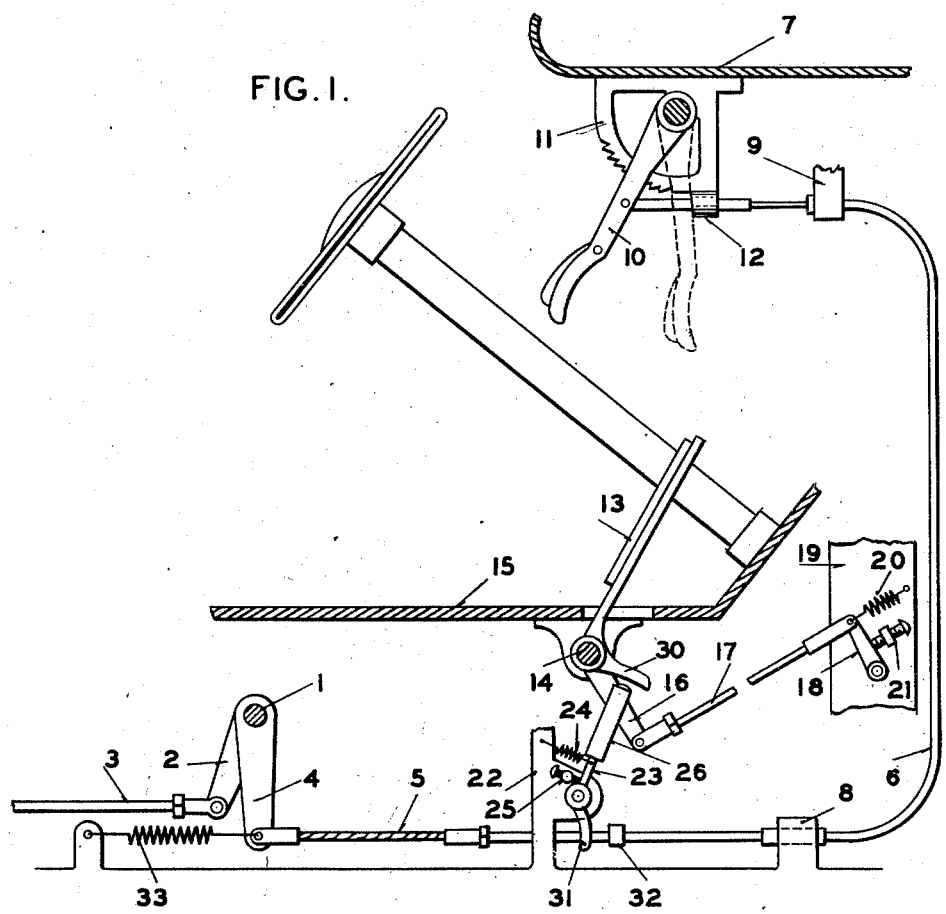
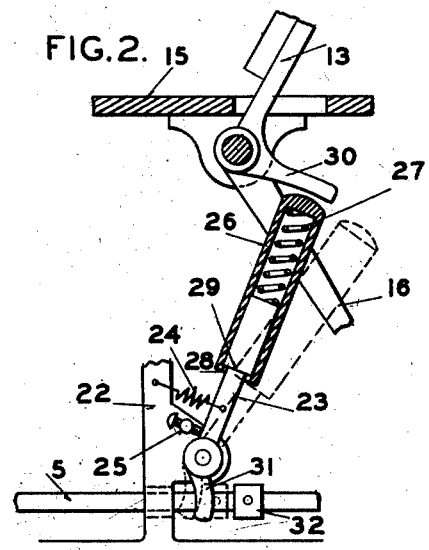
INVENTOR
BURNS DICK Jan. 21, 1941.                B. DICK                2,229,056
            PARKING BRAKE AND ACCELERATOR INTERLOCK
                Filed Aug. 25, 1939        2 Sheets-Sheet 2
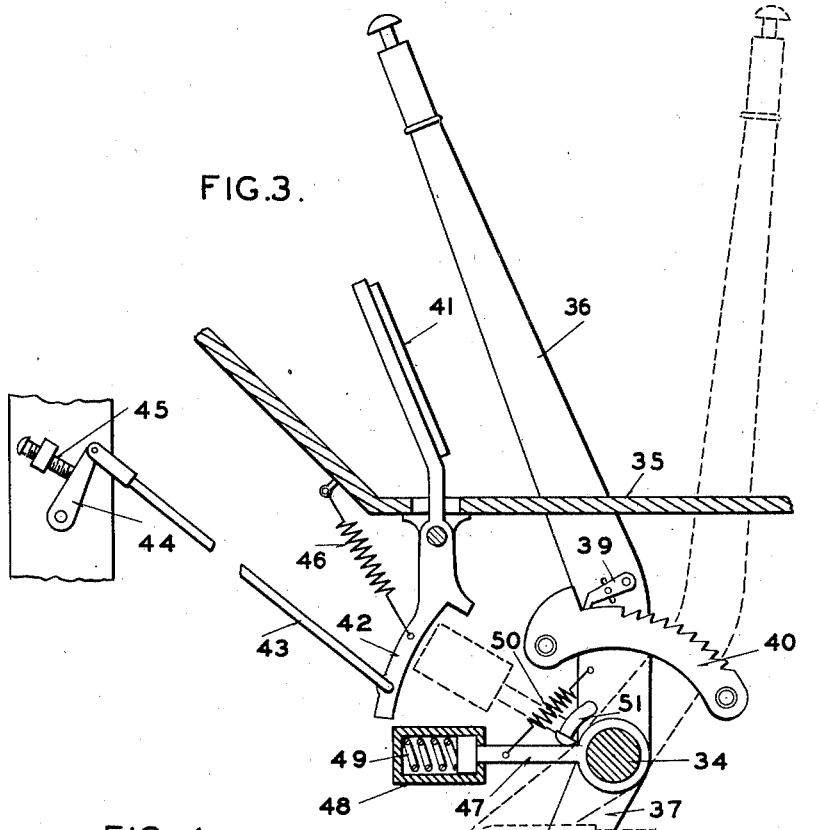
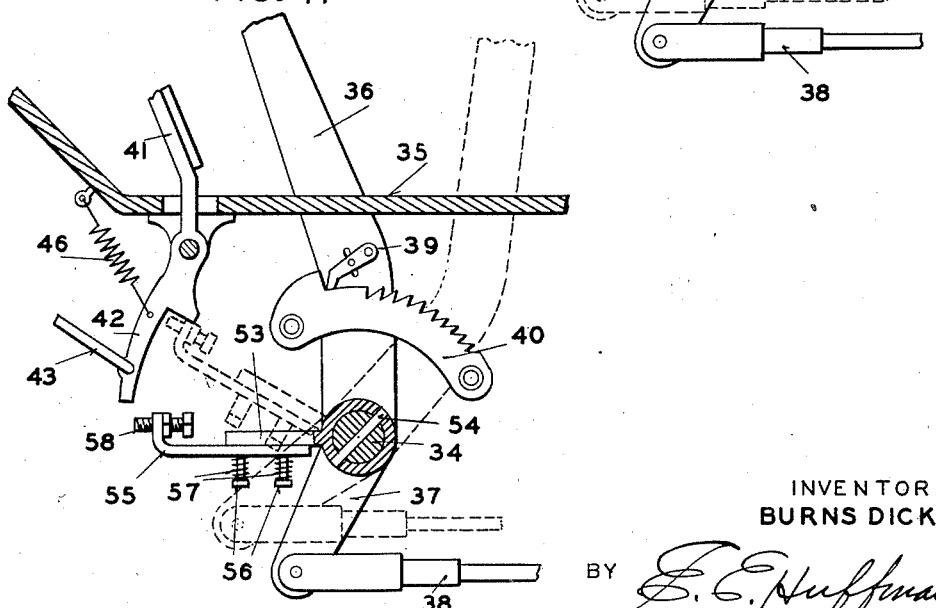
INVENTOR
BURNS DICK
BY *E. E. Huffman*
ATTORNEY Patented Jan. 21, 1941

2,229,056

UNITED STATES PATENT OFFICE 2,229,056

PARKING BRAKE AND ACCELERATOR INTERLOCK

Burns Dick, Ferguson, Mo., assignor to Wagner Electric Corporation, St. Louis, Mo., a corporation of Delaware Application August 25, 1939, Serial No. 291,852

14 Claims. (Cl. 188—2)

My invention relates to an interlocking mechanism and more particularly to such a mechanism for use with a parking brake control mechanism and an accelerator mechanism of a motor vehicle, its object being to provide an improved interlocking mechanism of the kind referred to which will prevent the accelerator mechanism from being operated in a normal manner whenever the parking brake control mechanism is not in full "off" position.

Other objects of my invention will become apparent from the following description taken in connection with the accompanying drawings in which Figure 1 is a schematic view of a parking brake control mechanism and an accelerator mechanism having associated therewith an interlocking mechanism embodying my invention; Figure 2 is an enlarged view of a portion of the mechanism shown in Figure 1; Figure 3 is a view showing an interlocking mechanism associated with a different type of parking brake control mechanism; and Figure 4 is a view similar to Figure 3 but showing a modified construction.

Referring to Figures 1 and 2, numeral 1 indicates a cross shaft on a vehicle which has secured thereto an arm 2 for actuating a brake rod 3 for applying the rear brakes of the vehicle by hand power for parking purposes. Also secured to the shaft 1 is an arm 4 which has connected thereto a cable 5 of a Bowden wire construction 6 extending to a point beneath the instrument panel 7, the sheath of which is secured at its ends to brackets 8 and 9. The cable of the Bowden wire construction is controlled by a hand lever 10 pivotally mounted to the underside of the instrument panel, said lever carrying suitable hand-controlled detent means for cooperation with a toothed sector 11 for holding the brakes applied in any position. The toothed sector member carries a stop 12 for determining the inoperative or brake "off" position of the brake lever 10.

The vehicle is also shown as provided with an accelerator pedal 13 secured on a shaft 14 carried by the underside of the floor boards 15. Also secured to the shaft 14 is an arm 16 which is connected by a rod 17 to the usual throttle control arm 18 for the inlet throttle valve (not shown) in the manifold 19 leading to the engine. A spring 20 biases the throttle valve to an idling position against a stop 21 and also maintains the accelerator pedal in its inoperative position.

Pivotally mounted on a suitable support 22 below the floor boards is an arm 23 normally biased by a spring 24 against an adjustable stop 25. The end of the arm has telescopically mounted thereon a cylindrical member 26 and interposed between the inner end of this member and the end of the arm is a spring 27 for yieldably holding the member extended to a position where the flanged end 28 engages a shoulder 29 on the arm. The accelerator pedal is provided with an integral arm 30 for cooperation with the end of the member 26, this arm being so arranged with respect to said member that the latter will lie in the path of movement of arm 30 when arm 23 is held against the stop by spring 24. The arm 23 is mounted adjacent the cable 5 of the Bowden wire control rod and carries a projection 31 for cooperation with a collar 32 secured to a rigid part of the cable 5. The shoulder and arm 31 are so related that when the brakes are in full released position and the hand lever 10 is held against the stop by means of the releasing spring 33, the collar 32 will engage the projection 31 and swing arm 23 to a position where the yieldable member 26 is not in the path of the arm 30 on the accelerator pedal (indicated by dotted lines of Figure 2). When the brake is applied or in any other position beside its full "off" position, the stop will be to the right of the projection 31, thus permitting the spring 24 to swing the arm 23 and yieldable member 26 to a position where it lies in the path of the arm 30, thereby preventing the normal operation of the accelerator pedal. The accelerator pedal, however, can be actuated by employing a greater operating force than is normally required since the member 26 can be pushed downwardly against the spring 27.

By means of the interlocking mechanism described, it is seen that whenever the hand brake lever 10 is in any position other than the full "off" position, the accelerator pedal cannot be operated in a normal manner. Because of this, the operator of the vehicle will be immediately warned that he has not released the brakes and should do so before starting the vehicle. The brakes must be fully released and the hand lever placed in its full "off" position before the yieldable member 26 will be out of the path of the arm 30 on the accelerator pedal to thereby permit the normal operation of the accelerator mechanism. By having the member 26 yieldable, the interlocking arrangement permits the operator, by employing more than normal operating force, to speed up his engine to a certain degree, notwithstanding the fact that the parking brake may not be fully released. Thus the engine can be so controlled that the vehicle can be started on an inclined roadway or the engine warmed up in cool weather with the parking brake partially or fully applied.

It is also to be noted that the arrangement of the interlocking mechanism between the accelerator mechanism and the hand brake operated mechanism is such that there will be no strain on the parts in the event the hand lever should be moved to apply the brakes when the accelerator mechanism is in an operative position. If the arm 30 is in the path of member 26, the latter will only engage the end of said arm and remain there until the accelerator mechanism is moved to its inoperative position at which time the spring 24 will move the yieldable member to its position beneath arm 30.

Referring to Figure 3, I have shown a modified construction in which an interlocking mechanism is associated with the accelerator mechanism and a parking brake control mechanism having its hand lever extending through the floor boards of the operator's compartment. The cross shaft 34 beneath the floor boards 35 has pivotally mounted thereon a hand lever 36 and an arm 37 on the lever is connected to the rod 38 leading to the brake actuating mechanism. The lever carries a detent 39 for cooperation with a toothed sector 40 for holding the lever in any operative position, the detent being controlled by the hand-operated member at the top of the lever in the usual manner.

The accelerator pedal 41 is pivoted to the underside of the floor board and is provided with an arm 42 to which is connected a rod 43 for controlling the arm 44 of the accelerator valve, normally held in the idling position of the valve against a stop 45 by means of a spring 46. Pivotally mounted on the cross shaft 34 adjacent the lever 36 is an arm 47 which has telescopically mounted thereon a cylindrical member 48 held in extended position by a spring 49. A spring 50 between the arm 47 and the lever normally holds the arm against the stop 51 carried by the lever so that the arm will swing with the lever except when it is prevented from doing so by the position of the arm 42 on the accelerator pedal.

The operation of the structure just described is substantially the same as that shown in Figure 1. When the hand lever is in its full brake "off" position, the yieldable member 48 and the arm 47 will be in a position out of the path of arm 42 on the accelerator pedal. If the hand lever should be in any other position but full "off" position, the cylindrical member will lie in the path of movement of arm 42 and the accelerator mechanism cannot be operated in the normal manner, thus informing the operator of the vehicle that the parking brake lever has not been placed in a position where the brakes are fully released. The spring between the member 48 and the arm permits the accelerator to be partially operated to speed up the engine if such is desired when the parking brake is not in full "off" position. If the accelerator mechanism is in an operative position when the hand lever is moved to an "on" position, the member 48 will abut the end of arm 42 and not follow the lever but as soon as the accelerator mechanism returns to its inoperative position, the spring 50 will position the yieldable member 48 in the path of the arm 42.

Referring to Figure 4, there is shown a slight modification of the structure shown in Figure 3. In place of having an arm rotatably mounted on the cross shaft 34, the arm 53 is fixed to the shaft by a pin 54. Arm 53 carries an extension 55 which is secured to the arm by bolts 56 and springs 57 permitting the extension 55 to yield with respect to arm 53 in the event the extension should engage the end of arm 42 on the accelerator pedal 4 due to an operative position of the accelerator mechanism. The end of the extension carries an adjusting screw 58 so as to properly adjust the distance between the end of extension 55 and the arm 42. The adjusting screw may be set at any desired position to either prevent operation of the accelerator mechanism when the parking brake is not in full "off" position or to permit limited operation so that the engine may be speeded up to a certain degree if desired.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a brake control mechanism, an operator-controlled accelerator mechanism, means operable by the brake control mechanism when in other than full brake "off" position for preventing normal operation of the accelerator mechanism, said means embodying a spring permitting the accelerator to be operated by the operator when said means is in operative position and only by employing greater operating force than that normally required, and a yieldable connection permitting actuation of the brake control mechanism to operative position notwithstanding the accelerator mechanism is in position where said means cannot be effective.

2. In apparatus of the class described, a brake control mechanism, an operator-controlled accelerator mechanism, means operable by the brake control mechanism when in other than full brake "off" position for preventing normal operation of the accelerator mechanism, said means comprising a pivotally mounted arm, a cooperating element movable in accordance with the movement of the accelerator mechanism, and means controlled by the brake control mechanism when moved to a position other than said brake "off" position for moving said arm into the path of movement of said element only when the accelerator mechanism is in inoperative position.

3. In apparatus of the class described, a brake control mechanism, an operator-controlled accelerator mechanism, means operable by the brake control mechanism when in other than full brake "off" position for preventing normal operation of the accelerator mechanism, said means comprising a pivotally mounted arm, a cooperating element movable in accordance with the movement of the accelerator mechanism, means operable by the brake control mechanism when moved to a position other than the brake "off" position for moving said arm into the path of movement of said element only when the accelerator mechanism is in inoperative position, and yieldable means comprising a spring carried by the end of the arm for permitting the accelerator mechanism to be operated by the operator by employing greater operating force than that normally required when the arm is in a position in the path of said element.

4. In apparatus of the class described, a brake control mechanism, an operator-controlled accelerator mechanism, and means operable by the brake control mechanism when in other than full brake "off" position for preventing normal operation of the accelerator mechanism, said means comprising two associated parts, one of which is connected to move in accordance with the movement of the accelerator mechanism and the other of which is connected to move with the brake mechanism and is capable of assuming a position in the path of the first named part only when the accelerator mechanism is not being operated, and yieldable means between the second part and the brake control mechanism for permitting the brake control mechanism to be placed in a brake operative position notwithstanding the accelerator mechanism is in an operative position causing said first part to be in a position preventing the second part from assuming its position in the path of movement of the first part.

5. In apparatus of the class described, a brake control mechanism, an operator-controlled accelerator mechanism, means operable by the brake control mechanism when in other than full brake "off" position for preventing normal operation of the accelerator mechanism, said means comprising cooperating parts, one of which is a pivoted arm so controlled by the brake control mechanism as to move into the path of the other part which is movable in accordance with the movement of the accelerator mechanism, and a yieldable connection between said arm and the brake control mechanism permitting the latter to be operated to a position other than brake "off" position in the event the position of the other part is such as to prevent the first part from assuming its position in the path of movement of said other part.

6. In motor vehicle apparatus of the class described, a brake control mechanism comprising a lever mounted beneath the instrument panel and a flexible cable connecting the lever to the brakes to be operated, an operator-controlled accelerator mechanism, and means controlled by the brake control mechanism when in other than full brake "off" position for preventing normal operation of the accelerator mechanism, said means comprising a member operatively connected to the cable and so positioned as to be movable into the path of an element movable in accordance with the accelerator mechanism.

7. In motor vehicle apparatus of the class described, a brake control mechanism comprising a lever mounted beneath the instrument panel and a flexible cable connecting the lever to the brakes to be operated, an operator-controlled accelerator mechanism, means controlled by the brake control mechanism when in other than full brake "off" position for preventing normal operation of the accelerator mechanism, said means comprising a member operatively connected to the cable and so positioned as to be movable into the path of an element movable in accordance with the accelerator mechanism, and yieldable means associated with the member for permitting the accelerator mechanism to be operated by the operator when said member is in operative position only by employing greater operating force than that normally required.

8. In motor vehicle apparatus of the class described, a brake control mechanism comprising a lever mounted beneath the instrument panel and a flexible cable connecting the lever to the brakes to be operated, an operator-controlled accelerator mechanism, means controlled by the brake control mechanism when in other than full brake "off" position for preventing normal operation of the accelerator pedal, said means comprising an arm pivotally mounted adjacent an element movable in accordance with the accelerator mechanism, a spring biasing said arm into the path of movement of said element, and means operable by the cable when the brake control mechanism is in full brake "off" position for moving said arm to a position permitting normal operation of the accelerator mechanism.

9. In motor vehicle apparatus of the class described, a brake control mechanism comprising a lever mounted beneath the instrument panel and a flexible cable connecting the lever to the brakes to be operated, an operator-controlled accelerator mechanism, means controlled by the brake control mechanism when in other than full brake "off" position for preventing normal operation of the accelerator pedal, said means comprising an arm pivotally mounted adjacent an element movable in accordance with the accelerator mechanism, a spring biasing said arm into the path of movement of said element, means operable by the cable when the brake control mechanism is in full brake "off" position for moving said arm to a position permitting normal operation of the accelerator mechanism, and yieldable means carried by the arm for cooperating with said element of the accelerator mechanism and permitting the accelerator mechanism to be operated by the operator when said arm lies in the path of movement of said element but only by employing greater operating force than that normally required.

10. In apparatus of the class described, a brake control mechanism comprising a pivoted lever, an operator-controlled accelerator mechanism having a part movable in accordance with the mechanism, an arm connected to swing in accordance with movement of the lever and adapted to be positioned in the path of movement of said movable part during the operation of the accelerator from "off" position to an operative position and when the lever is in other than full brake "off" position, and yieldable means carried solely by the arm and cooperating with said movable part for permitting the accelerator to be operated only by employing greater operating force than that normally required when said arm is in an operative position.

11. In apparatus of the class described, a brake control mechanism comprising a pivoted lever, an operator-controlled accelerator mechanism having a part movable in accordance with the mechanism, an arm pivotally mounted on the same axis as said lever, a yieldable connection between said arm and the lever for normally causing said arm to swing with the lever and to a position in the path of movement of said movable part of the accelerator mechanism when said accelerator mechanism is in an inoperative position and when the lever is in other than full brake "off" position, said yieldable connection permitting the lever to be moved to a brake "on" position in the event the arm is prevented from assuming a position in the path of movement of said part of the accelerator mechanism due to said mechanism being in an operative position.

12. In apparatus of the class described, a brake control mechanism comprising a pivoted lever, an operator-controlled accelerator mechanism having a part movable in accordance with the mechanism, and an arm connected to the lever to be movable therewith to a position in the path of movement of said movable part of the accelerator mechanism when the lever is in other than full brake "off" position and when said accelerator mechanism is in an inoperative position, said arm comprising two parts yieldably connected together for permitting the lever to be moved to a brake "on" position in the event said arm is prevented from assuming a position in the path of movement of said part of the accelerator mechanism due to said mechanism being in an operative position.

13. In apparatus of the class described, a brake control mechanism, an operator-controlled accelerator mechanism, means operable by the brake control mechanism when in other than full brake "off" position for preventing normal operation of the accelerator mechanism, said means comprising a pivotally mounted arm, a cooperating element movable in accordance with the movement of the accelerator mechanism, means controlled by the brake control mechanism when moved to a position other than said brake "off" position for moving said arm into the path of movement of said element only when the accelerator mechanism is in an inoperative position, and adjustable means carried by the end of said arm for varying the distance between the arm and the cooperating element when the accelerator mechanism is inoperative and when said arm is in an operative position.

14. In an apparatus of the class described, a brake control mechanism, an operator-controlled accelerator mechanism, means comprising a spring-biased plunger connected to be movable as a unit with the brake control mechanism and capable of assuming a position in the path of movement of an element of the accelerator mechanism when the brake control mechanism is in other than full brake "off" position for preventing the accelerator from being operated by the operator except by employing a greater operating force than that normally required.

BURNS DICK.